United States Patent Office 3,297,308
Patented Jan. 10, 1967

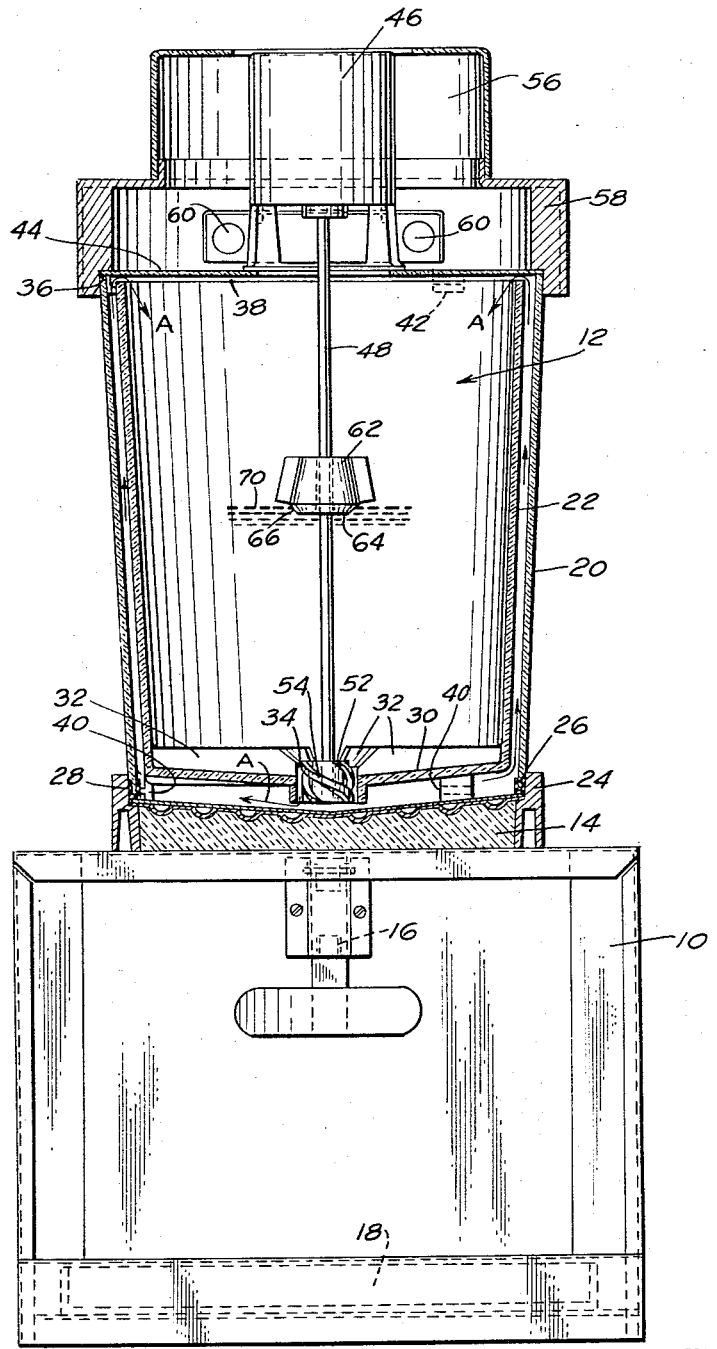

3,297,308
BEVERAGE DISPENSER
Virgil John Philipps, Chicago, Ill., assignor to American Machine & Foundry Company, a corporation of New Jersey
Continuation of application Ser. No. 103,803, Apr. 18, 1961, now Patent No. 3,106,383. This application Dec. 11, 1964, Ser. No. 437,334
1 Claim. (Cl. 259—97)

This application is a continuation of copending application Serial No. 103,803, filed April 18, 1961 and a continuation in part of an application Serial No. 19,321, filed April 1, 1960, now U.S. Patent 3,106,383, issued October 8, 1963 which was copending with application Serial No. 103,803 now abandoned.

This invention relates to a beverage dispenser for fruit juices, concentrated fruit drinks and other similar beverages.

Fruit beverages, particularly those in pure juice form, are highly perishable, easily subject to separation into component parts (i.e., water and pulp) and susceptible to loss of potability as a result of rough or improper handling. Because of these facts great difficulty has been encountered in the storage of such beverages and in the automatic or semi-automatic dispensing of the same.

In the heretofore known dispensers, the beverage is stored in a reservoir comprising a single bowl structure overlying a cooling element (conventionally a cold plate). In order to prevent the accumulation of ice crystals caused by the transfer of heat from the standing beverage to the cold plate, and in order to keep the beverage well mixed, the liquid is agitated by pump means, rotor blades or some similar mechanism. Beside being a poor circulation for the beverage, the agitation produces an undue mechanical strain on the beverage components. In fact, it speeds the disintegration of the juice cells and the separation of pulp from the fluid, causing the beverage to lose its fresh appearance and taste. The present invention overcomes these deficiencies by providing a novel reservoir and circulating system for fruit juice and similar beverage dispensers.

The prime object of the present invention is to provide an improved receptacle and dispenser for the prolonged storage and sanitary dispensing of fruit beverages.

It is another object of the present invention to provide a novel reservoir means which will eliminate the separation of and/or disintegration of juice into its various components during the period it is being stored and dispensed. It is another object of the present invention to provide a beverage dispenser having a reservoir which, in combination with refrigerating and dispensing apparatus, will be attractive and pleasing in appearance and which will present a novel appetizing display encouraging the sale of the beverage.

It is another object of the present invention to provide a beverage dispenser in which there is a minimum opportunity for unsanitary conditions to arise and which is readily and easily cleanable.

Accordingly, the present invention provides a beverage dispenser having a reservoir for the storage of a quantity of liquid, comprising a pair of substantially like shells, mounted in spaced relation one within the other, and means for causing the liquid to circulate through the smaller shell and between the walls of said spaced shells.

The above and other objects not mentioned will be readily apparent from the following description and accompanying drawing which describes and depicts in detail the constructions and combinations of the present invention.

In general, the dispenser shown in the drawing comprises a lower cabinet housing 10 on which the beverage reservoir, generally indicated as 12, is mounted. The cabinet 10 contains a hermetically sealed refrigerating system including a cold plate 14 mounted on the upper wall. A spigot 16 or dispensing valve is mounted on the base 10 and extends into the reservoir 12 in order that liquid may be extracted from the reservoir on demand. A drip pan 18 is also provided, as can any number of additional features not described here, since the cabinet structure is of the type quite common in the art. Because the refrigerating apparatus, its control circuitry and related mechanisms are all types common to the art, they are not described in detail, but are merely mentioned to give environment to the present invention. It is to be understood that the present invention is not limited in application to the particular type of dispenser shown.

The reservoir of the present invention comprises an outer shell or bowl 20 and an inner bowl 22, wherein the bowl 22 is mounted and spaced concentrically from the outer shell 20. The outer shell 20 is formed of a substantially cyclindrical section of plastic, glass or other suitable transparent or translucent material and is mounted directly on the cold plate 14. To mount the shell 20, the upper wall of the housing 10 has extending from it a flange member 24 which surrounds the edge of the cold plate 14 so as to form with it a seat for the lower edge 26 of the outer shell 20. A rubber channel gasket 28 is secured to the edge 26 of the outer shell 20 so that the entire assembly may be force fit into the seat formed by the flange 24 and cold plate 14 and into a fluid tight fixed position. Although other suitable fastening means may be employed to secure the outer shell 20 temporarily or permanently to the flange 24 or on the cabinet 10, no such means are actually necessary since, in accordance with the present construction, the outer shell 20 will sit securely even when filled with fluid. Also, the fact that the shell 20 is not more permanently fixed permits its easy removal for cleaning.

Mounted within the outer shell 20 and spaced therefrom and from the cold plate 14, at its bottom, is the inner bowl 22 formed, preferably, of the same material and having substantially the same shape as the outer shell 20. The inner bowl 22 has, in addition, a bottom wall 30 which is formed with a member of upwardly directed radial vanes 32 and a centrally located aperture or fluid exit 34 extending downwardly toward the cold plate 14. While the inner bowl has the same general shape as the outer shell 20, the inner bowl 22 is slightly smaller in all its dimensions so that when mounted within the outer shell 20, it may be uniformly spaced from the inner wall of the outer shell 20 and from the cold plate 14. The upper edge 36 of the outer shell 20 which is, of course, taller than the inner bowl 22 will also extend beyond the upper edge 38 of inner bowl 22. The exact dimension of the space between the respective walls of the bowl 22 and shell 20 is not critical, although it is to be observed briefly here that its purpose is to permit circulation of the fluid within the reservoir by having it suitably impelled by means located in the opening 34, across the cold plate 14, and then, as indicated by the arrows A, upwardly through the space between the bowl and shell for return to the inner bowl. It is preferable, however, to have the space between bowl and shell of limited width so that as little force as possible is required to impell the fluid in its circulating path. While the width of the space may need to vary in differing dispensers because of the type of beverage, or because of the type of impeller used, it has been found that a width between ¼–¾ of an inch has been satisfactory for nearly all beverages in common use.

The inner bowl 22 is rigidly supported on a number of blocks 40 resting on the cold plate and is held concentrically within the outer shell 20 by a number of wedge members 42 placed between the upper edges of the outer shell and the bowl. The blocks 40 and wedge members 42 may or may not be formed integrally within the shell 20 or inner bowl, as described. On the other hand, any suitable means for spatially maintaining the inner bowl 22 from the outer shell 20 may be readily employed.

The reservoir is covered by a suitable cover plate 44 which may merely be formed to rest upon the upper edge of the outer shell. Mounted, preferably separably, on the cover plate 44 is a small fractional horsepower motor 46 having a driven shaft 48 extending therefrom through a hole 50 suitably formed in the cover plate into the inner bowl 22. A suitable screw impeller 52 is mounted at the end of shaft 48 so as to be located within the opening or exit 34 just above the cold plate 14. The impeller units 52 are formed of plastic or other suitable material in the shape of a truncated screw having flutes or threads 54 of a diameter barely smaller than the inner diameter of the opening 34. The entire assembly of motor, shaft and impeller is a single unit and may be withdrawn easily from the reservoir for cleaning or repair. Suitable electrical control apparatus, conventional in the art and therefore not shown in the drawing, may be provided to operate the motor to actuate the screw impeller. The screw impeller 52 of course rotates within the opening 34, moving the fluid contained in the bowl outwardly in the manner suggested previously and described in detail later.

For the purpose of enhancing the appearance of the dispenser, an illuminated sign 56 and a reflector 58 may be mounted over the motor 46. Also mounted in conjunction with the motor may be a pair of lamps 60 which can illuminate the sign as well as the interior of the reservoir.

In operation, the reservoir 12 is filled by pouring the beverage into the inner bowl 22 through the top, after removal of the motor and impeller assembly, or through another hole suitably positioned in the cover plate 44 in a conventional manner. The actuated impeller 52 thrusts the liquid downwardly from the inner bowl 22 into the space 35 between the cold plate 14 and then upwardly between the walls of the concentrically positioned bowl and shell. The liquid is thus caused to circulate over the cold plate 14 and back to the inner bowl 22 in the direction shown by the arrows A. The radial vanes 32 insure that the liquid in the center of the inner bowl 22 does not agitate. While the vanes 32 are preferred, other agitation inhibitors, such as a circular wall about the opening 34, may be employed as well. As a result of the movement imparted by the impeller 52, the liquid will flow gently between the bowl and the outer shell and over the top edge 38 of the inner bowl 22, returning without a splash into the inner bowl. It is this gentle circulation of the liquid that maintains the beverage in its proper mixture and suspension and prevents the breakdown of the pulp or juice cells, and keeps the beverage from separating. It is noted that the beverage is not agitated nor does it undergo undue mechanical stress or strain. Thus, it is obvious that the action and results of the present construction are unlike those of the heretofore known dispensers employing conventional reservoirs and agitating means mentioned previously.

Another important advantage of the present construction, resulting in a very pleasing and attractive dispenser, is that the reservoir will always appear to be full due to the fact that the liquid rising from the bottom of the reservoir will completely fill the space between the bowl and the outer shell. The illumination produced by the lamps 60 will also cause a pleasing color effect in illuminating the thin column of liquid.

So long as some fluid remains in the reservoir, circulation will occur and the reservoir will appear to be full. At times this will present somewhat of a minor problem to the dispenser operator, who will be unable to determine exactly when to refill the reservoir. In order to apprise the operator of a diminished supply of fluid, a float 62 is slidably mounted on the motor shaft 48. The float 62 is made of light plastic, or similar material, in a somewhat substantially hollow truncated conical form, being at its base 64 somewhat larger than the opening 34 in the bottom of the inner bowl 22. Extending downwardly from the base 64 of the float 62 is a tapered lip 66 adapted to enter into opening 34 and guide the float over the entire opening. Fins 68 are provided to stabilize the float 62 and to add weight to it. When the float is used minor modification of the bottom wall 30 or the length of impeller 52 must be made to insure that the float 62 will cover the opening 34. Such modification may take the form of shortening the impeller 52 or of building up the bottom wall 30 so that the impeller will not prevent the float from seating in the opening 34. On the other hand, modification to the float 62 itself will be apparent to those skilled in the art. The float 62 is adapted to ride on top of the fluid (shown in outline 70 in the figure) contained in the inner bowl and to seal the opening 34 when no fluid remains in the bowl. Thus, the small amount of fluid that may be trapped between the walls of the bowl and the cold plate and outer shell will be prevented from recirculating and the reservoir will, of course, appear empty. The reservoir can then be refilled, at which time the float will rise and the liquid will begin to circulate.

It will also be observed that through the present construction, the dispenser and reservoir can be easily dismantled and cleaned, assuming first, of course, that the reservoir is empty of substantially all of the liquid.

While the foregoing description describes the invention in the form of a cylindrical reservoir, it is quite clear that any shaped shell and inner bowl may be utilized, provided that they are of substantially the same shape to provide a substantially uniform (although this is not a critical limitation) space between them.

Since it will thus be seen that the objects set forth above and those made apparent from the preceding description are efficiently attained and that various changes may be made in the form, construction and arrangement of the parts herein without departing from the spirit and scope of the invention and without sacrificing any of its advantages, it will be understood that all the matter herein is to be interpreted as illustrative and not in a limiting sense.

What is claimed is:

In a beverage dispenser, a reservoir for the storage of a quantity of liquid, comprising a pair of substantially cylindrical light permeable bowls, one of said bowls being smaller in dimension than the other and formed with a substantially open top and a bottom wall, said bottom wall being formed with a central aperture, said aperture being substantially small with respect to the size of said bottom wall, a plurality of radial vanes protruding upwardly therefrom and an annular flange member surrounding said hole depending therefrom, said smaller bowl being mounted within said other bowl so as to form a relatively narrow space between their respective bottom and side walls, and circulating means comprising a motor mounted above said smaller bowl, an elongated rotatable rod connected to said motor extending within said smaller bowl, a helical screw impeller member secured at the end of said rod and located within said hole in the bottom wall of said smaller bowl, for creating and continuously moving a substantially unbroken sheet of said liquid, without substantial agitation, in a path flowing from said smaller bowl upwardly between said spaced bowls to the top of said smaller bowl for discharge thereinto so that even a partially empty reservoir appears full.

References Cited by the Examiner

UNITED STATES PATENTS

| | | | |
|---|---|---|---|
| 1,845,548 | 2/1932 | Schmidt | 165—120 X |
| 2,199,196 | 4/1940 | Evans | 222—113 |
| 3,064,949 | 11/1962 | Dewenter. | |

FOREIGN PATENTS

| | | |
|---|---|---|
| 1,196,763 | 5/1959 | France. |
| 788 | 4/1889 | Switzerland. |

ROBERT A. O'LEARY, *Primary Examiner.*

T. W. STREULE, *Assistant Examiner.*